US012807079B2

(12) United States Patent
Ive et al.

(10) Patent No.: US 12,807,079 B2
(45) Date of Patent: Nov. 24, 2026

(54) CONTENT DISPLAY DEVICE FOR ROAD VEHICLE AND RELATIVE ROAD VEHICLE

(71) Applicant: FERRARI S.P.A., Modena (IT)

(72) Inventors: Jonathan P. Ive, San Francisco, CA (US); Eugene Whang, San Francisco, CA (US); Jeremy Bataillou, San Francisco, CA (US); Anthony Ashcroft, San Francisco, CA (US); Suhang Zhou, San Francisco, CA (US); Benoit Louzaouen, San Francisco, CA (US); Jemima Kiss, San Francisco, CA (US); Christopher Wilson, San Francisco, CA (US); Wan Si Wan, San Francisco, CA (US); Biotz Natera, San Francisco, CA (US); James Mcgrath, San Francisco, CA (US); Roger Guyett, San Francisco, CA (US); Joseph Luxton, San Francisco, CA (US); Michael Matas, San Francisco, CA (US); Patrick Kessler, San Francisco, CA (US); Patrizio Moruzzi, Modena (IT); Vito Conigliaro, Modena (IT)

(73) Assignee: FERRARI S.P.A., Modena (IT)

( * ) Notice: Subject to any disclaimer, the term of this patent is extended or adjusted under 35 U.S.C. 154(b) by 426 days.

(21) Appl. No.: 18/499,274

(22) Filed: Nov. 1, 2023

(65) Prior Publication Data

US 2024/0166143 A1 May 23, 2024

(30) Foreign Application Priority Data

Nov. 4, 2022 (IT) ........................ 102022000022674

(51) Int. Cl.
*B60R 11/00* (2006.01)
*B60R 11/02* (2006.01)
*B62D 25/14* (2006.01)

(52) U.S. Cl.
CPC .......... *B60R 11/0235* (2013.01); *B62D 25/14* (2013.01); *B60R 2011/0005* (2013.01)

(58) Field of Classification Search
CPC ........ B60R 11/0235; B60R 2011/0005; B62D 25/14

(Continued)

(56) References Cited

U.S. PATENT DOCUMENTS

| | | | | |
|---|---|---|---|---|
| 11,235,710 | B1 * | 2/2022 | Shumaker | F16M 11/2028 |
| 2024/0149680 | A1 * | 5/2024 | Ive | B60K 35/22 |

FOREIGN PATENT DOCUMENTS

| | | | |
|---|---|---|---|
| DE | 4213129 | C2 | 1/1996 |
| DE | 102015011646 | A1 | 3/2017 |
| FR | 3087391 | A1 | 4/2020 |

OTHER PUBLICATIONS

IT Italian Search Report for Application No. 102022000022674; Filing Date: Nov. 4, 2022; Date of Completion: May 4, 2023; 6 pages.

* cited by examiner

*Primary Examiner* — Steven O Douglas
(74) *Attorney, Agent, or Firm* — CANTOR COLBURN LLP

(57) ABSTRACT

A content display device for a road vehicle comprising: a support element configured to be mounted centrally at a vehicle dashboard or a central tunnel of the road vehicle; at least one screen, mechanically connected to the support element and configured to be visible to a passenger and/or to a driver while driving; a movement system coupled to the support element and hingeable to the vehicle dashboard or to (Continued)

the central tunnel to alternatively rotate the screen towards the driver and/or towards the passenger.

9 Claims, 5 Drawing Sheets

(58) Field of Classification Search
USPC ...................................................... 296/24.34
See application file for complete search history.

CONTENT DISPLAY DEVICE FOR ROAD VEHICLE AND RELATIVE ROAD VEHICLE

CROSS-REFERENCE TO RELATED APPLICATIONS

This patent application claims priority from Italian patent application no. 102022000022674 filed on Nov. 4, 2022, the entire disclosure of which is incorporated herein by reference.

TECHNICAL FIELD

The present invention concerns a content display device for a road vehicle and a relative road vehicle.

In particular, the present invention is advantageously, but not exclusively, applied in a content display device for a high-performance road vehicle, to which the following description will explicitly refer without loss of generality.

BACKGROUND TO THE INVENTION

Generally, road vehicles are provided with a plurality of display devices arranged on the dashboard of the road vehicle.

Historically, each road vehicle comprises at least one display device for the driver, for example the screens or indicators arranged on the vehicle instrument panel, namely on the portion of dashboard interposed between the steering wheel and the windscreen.

In recent years, said devices can be assisted by other screens (for example at least one screen arranged centrally on the dashboard or a head-up display) which complete display of the information for the driver.

In general, the arrangement of an increasingly large central screen is becoming increasingly popular, especially in fully electric cars; however, in the majority of cases, said central screens are exclusively provided with touch controls, which during sports car driving (for example on the track) make it difficult, if not impossible, to select a function without distracting the driver. Furthermore, said screens are generally integral with the dashboard and therefore, whilst they are visible both to the driver and to the passenger, they do not provide an optimal view of the information for either of them both in terms of perspective and due to possible reflections (for example caused by the sun or the headlights of another vehicle), which considerably reduce the rapidity with which the driver can read said information.

In addition, although devices have been developed to be visible also to the passengers of road vehicles, said devices are generally associated with the rear seats, since it is difficult for a passenger sitting in the front seat, alongside the driver, to view distracting content such as films, documentaries, news, etc. without distracting the driver. For this reason, it is difficult for the front passenger to view distracting content via the central screen.

In recent years, to overcome the problem of driver distraction, the front passenger is allowed to view distracting content only with the vehicle at a standstill. During driving, on the other hand, the front passenger is allowed to view only content deemed to be non-distracting, for example the speed, route or other contents that aid driving (such as the current gear, lateral accelerations) which, for example, the driver can view via other screens.

However, said solutions limit the entertainment of the front passenger (namely the passenger sitting alongside the driver), reducing the pleasure of the ride.

In general, therefore, the need is felt to increase the flexibility of the vehicle display systems, allowing the driver to read the information more rapidly and, at the same time, enabling the passenger to view distracting content.

Furthermore, the need is felt to improve the usability of the driving-related information also outside the vehicle, so that if necessary some of the vehicle performances can be studied also after the driving session.

DESCRIPTION OF THE INVENTION

The object of the present invention is to provide a content display device for a road vehicle and a relative road vehicle which are at least partially exempt from the drawbacks described above and, at the same time, simple and inexpensive to produce.

According to the present invention, a content display device for a road vehicle and a relative road vehicle are provided as claimed in the following independent claims and, preferably, in any one of the claims depending directly or indirectly on the independent claims.

The claims describe preferred embodiments of the present invention forming an integral part of the present description.

BRIEF DESCRIPTION OF THE DRAWINGS

Below, some embodiments of the invention will be described for a better understanding thereof by way of non-limiting example and with reference to the attached drawings in which.

EMBODIMENTS OF THE INVENTION

Figure 1:
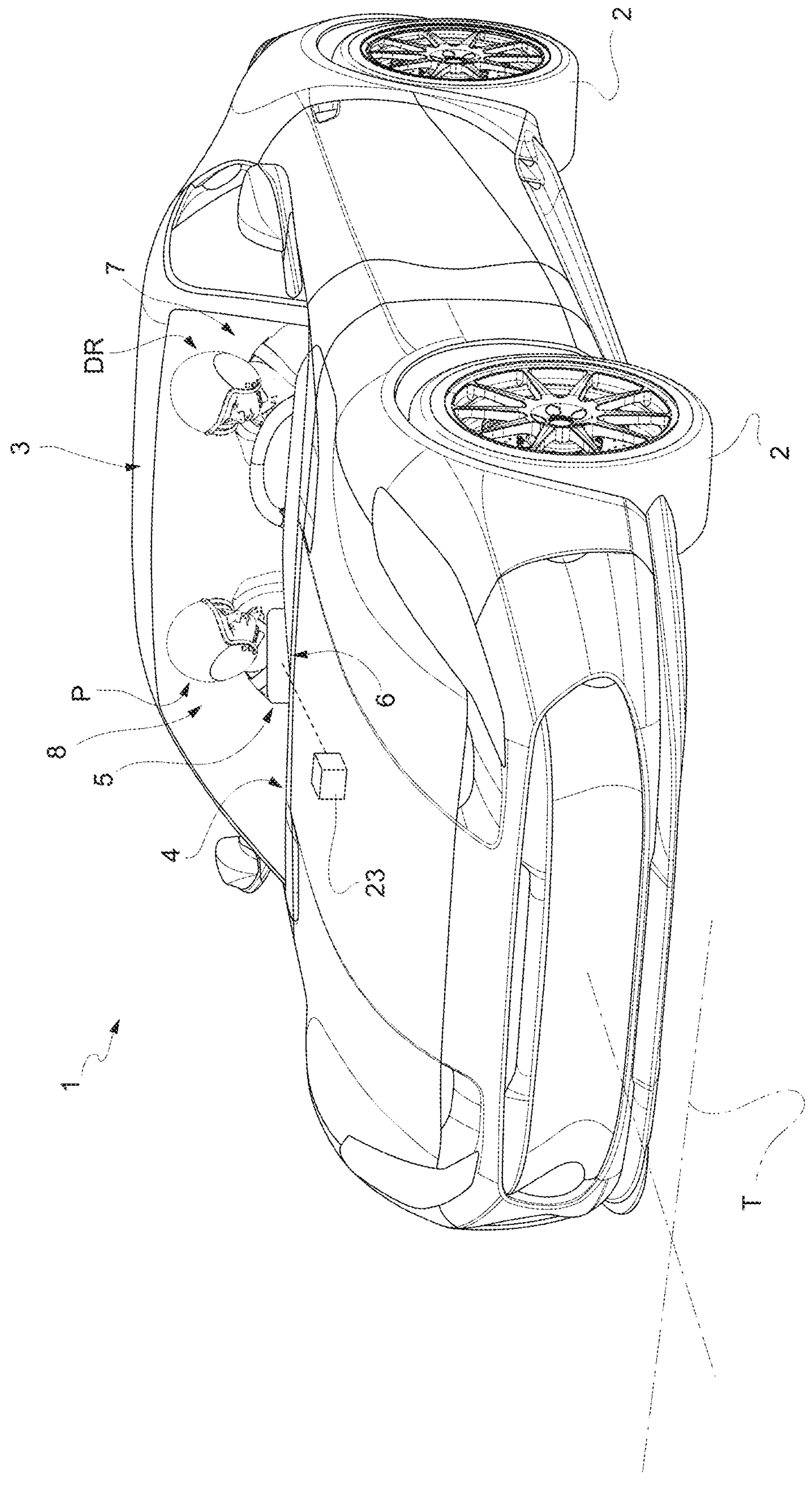
FIG. 1 is a perspective and schematic view, with details removed for clarity, of a possible embodiment of a road vehicle in accordance with the present invention.

In FIG. 1, the number 1 indicates overall a road vehicle provided with two front wheels 2 and two rear wheels 2 (in particular driving wheels). The vehicle 1 is provided with a passenger compartment 3 which is adapted to house at least one driver DR and preferably one or more passengers P, of which at least one alongside the driver DR as illustrated in FIG. 1.

The same reference numbers and letters in the figures identify the same elements or components with the same function.

In the context of the present description the term "second" component does not imply the presence of a "first" component. Said terms are employed as labels to improve clarity and should not be understood in a limitative manner.

The elements and the characteristics illustrated in the different preferred embodiments, including the drawings, can be combined with or isolated from one another without departing from the protective scope of the present application as described below.

Furthermore, the road vehicle 1 comprises a frame (of known type and therefore not illustrated in detail), and a vehicle dashboard 4 inside the passenger compartment and fixed to the frame. The vehicle dashboard 4 is arranged frontally to the driver DR and to any passenger P.

Advantageously but without limitation, between the driver DR and the passenger P, the vehicle 1 comprises a central tunnel 14 (namely the object usually used to contain wiring and transmissions of the road vehicle 1 and separate the driver DR zone from the passenger P zone), arranged along a longitudinal axis of symmetry L of the passenger compartment 3.

As illustrated in the non-limiting embodiments of the attached figures, the road vehicle 1 comprises a content display device 5, which is arranged at the vehicle dashboard 4 or the central tunnel 14, in particular on a central portion 6 of the central tunnel 14 (or of the vehicle dashboard 4) between a driving position 7 and a passenger position 8.

The content display device 5 comprises a support element 9, which is configured to be mounted on the central portion 6. The support element 9, in other words, determines the main structure of the content display device 5, namely the portion on which the other components of the device 5 are mounted/assembled.

Furthermore, the display device 5 comprises a screen 10, which is mechanically connected to and preferably integral with the support element 9 and is configured to be visible to the driver DR and/or to the passenger P. The screen 10 is of known type (for example liquid crystal and preferably a touchscreen) and therefore is not further described below.

Advantageously but without limitation, the display device 5 comprises a portion 15 fixed to the road vehicle 1 and not removable, and a portion 16 that can be attached to the portion 15 and is removable.

Preferably, the removable portion 16 comprises (is) a tablet (with all related components and circuitry in terms of CPU and memories) provided at least with the screen 10.

Figure 2:
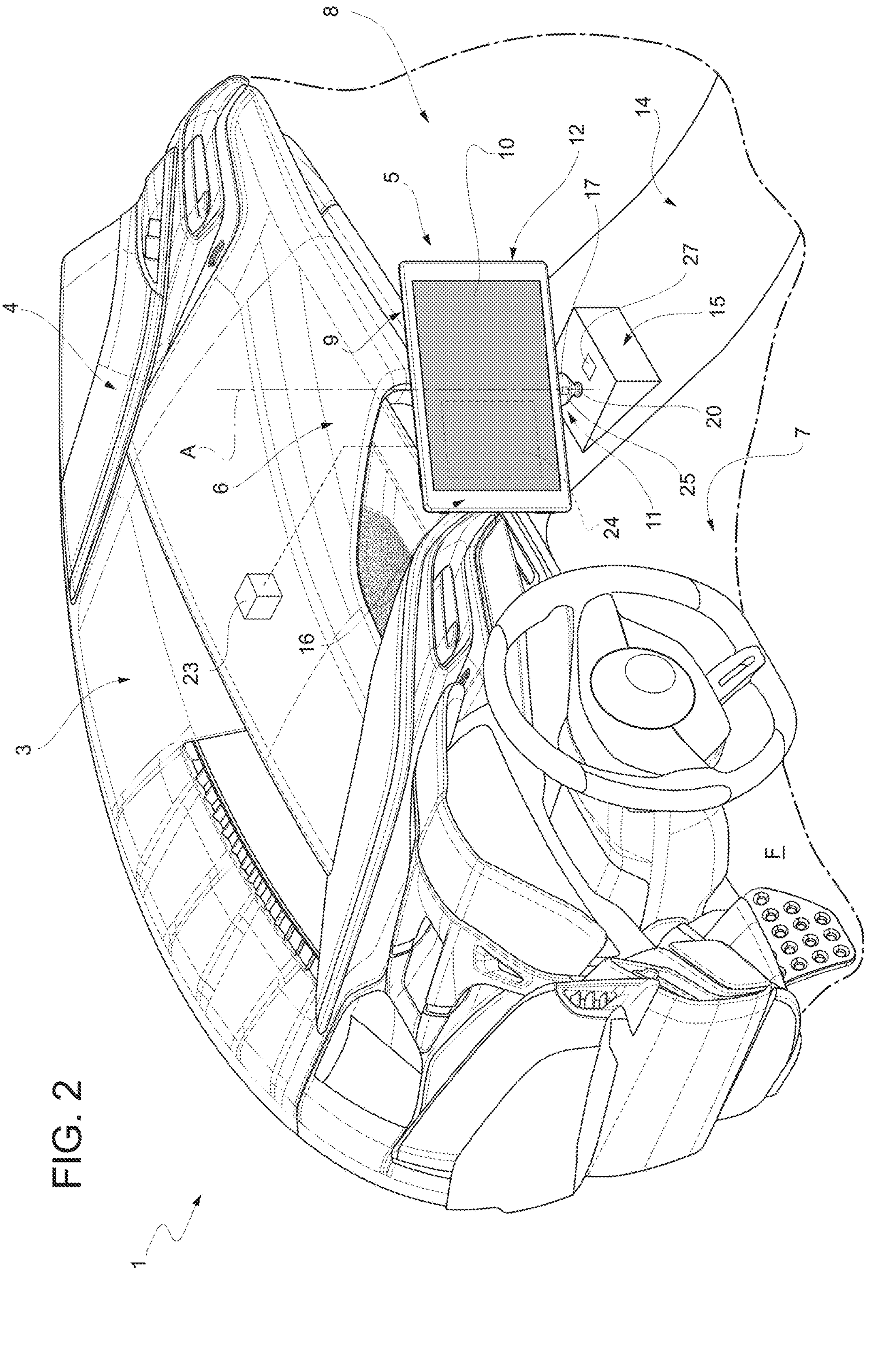
FIG. 2 is a perspective schematic view of part of the interior of the passenger compartment of the vehicle of FIG. 1 in which a central display device can be seen in a first position.
Figure 3:
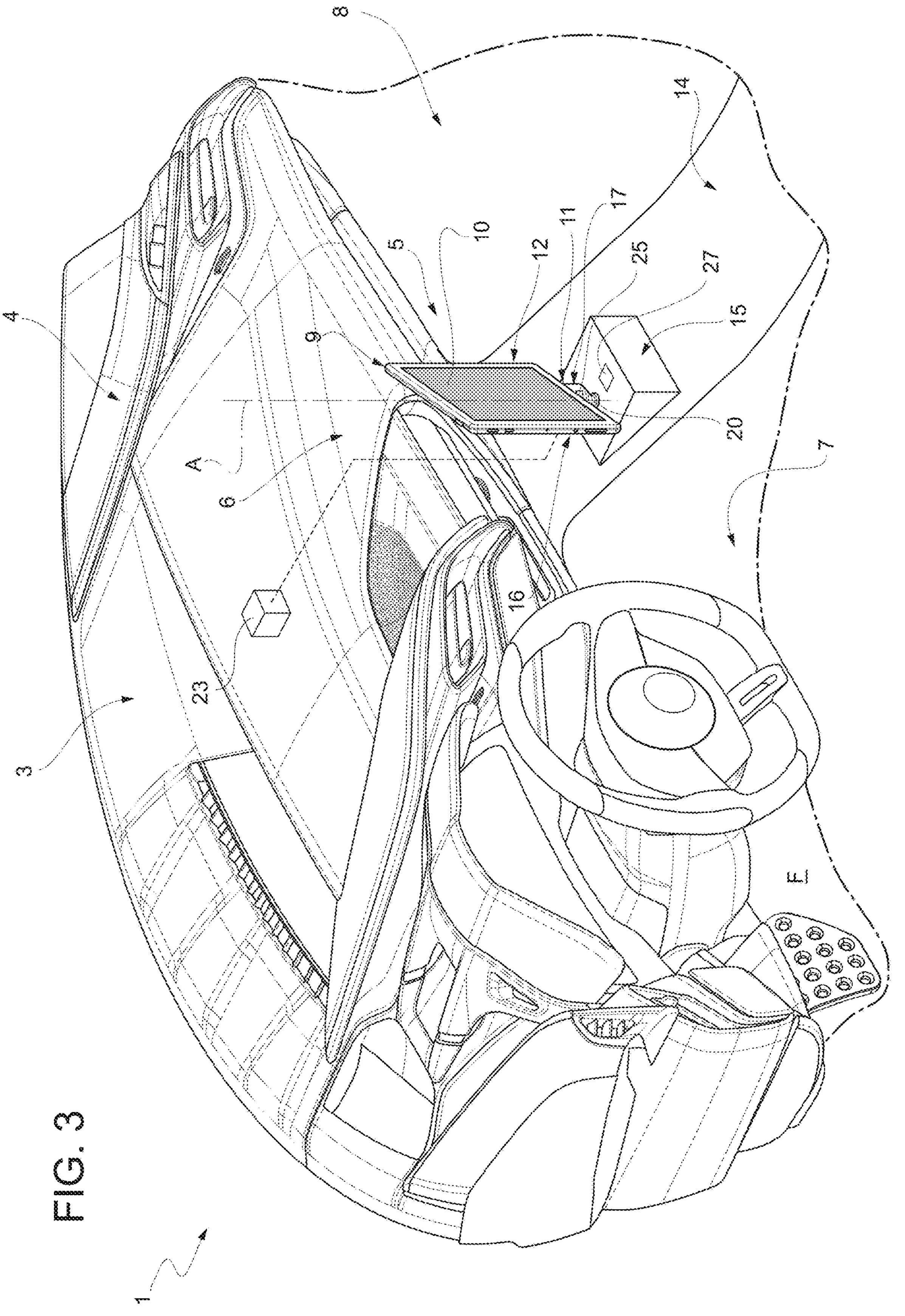
FIG. 3 is a perspective schematic view of part of the interior of the passenger compartment of the vehicle of FIG. 1 in which the central display device of FIG. 2 can be seen in a second position.
Figure 4:
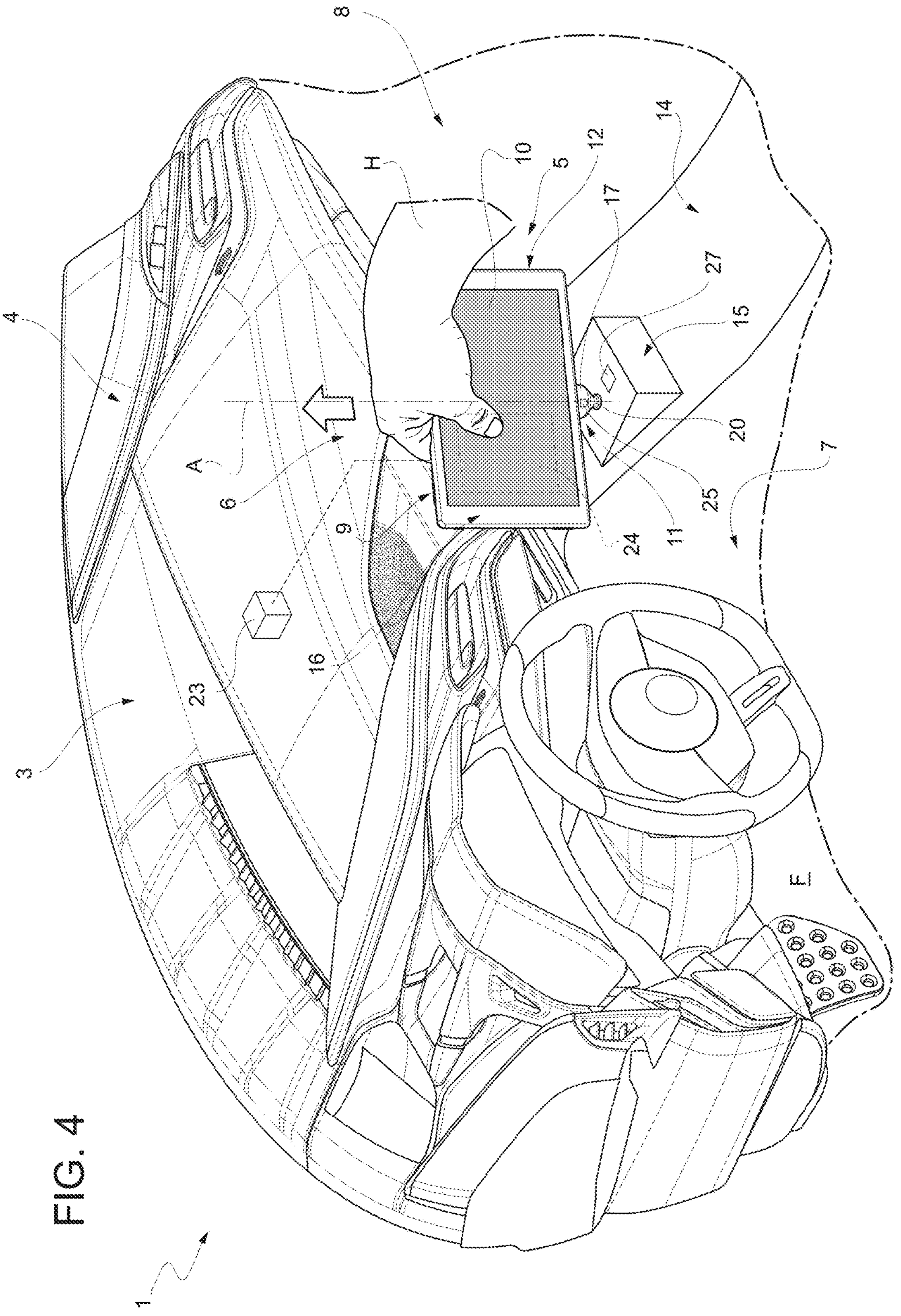
FIG. 4 is a perspective schematic view of part of the interior of the passenger compartment of the vehicle of FIG. 1 in which the hand of a user removing the central display device can be seen.

Advantageously, the content display device 5, in particular the portion 15 fixed to the road vehicle 1, comprises a movement system 11 which, on one side, can be attached to the support element 9 (for example to the back or to the base of the tablet, namely of the removable portion 16) and, on the other, is hinged to the dashboard 4 or to the central tunnel 14 (as illustrated in FIGS. 2 to 4) to alternately rotate the screen 10 towards the driver DR and/or towards the passenger P.

In particular, the movement system 11 is any mechanism that allows the support element 9 and therefore the screen 10 to pass from a first configuration in which the screen 10 is parallel to a transverse axis T of the road vehicle 1 (namely the configuration of FIG. 1, in which the screen is substantially perpendicular to the longitudinal axis L of the road vehicle 1), to at least a second configuration in which the screen 10 is inclined towards the driver DR (as illustrated in FIG. 2) and/or to a third configuration in which the screen 10 is inclined towards the passenger P (as illustrated in FIG. 3).

In particular, therefore, the movement system 11 is configured to rotate the support element 9 at least around an axis A at least partially transverse (in particular substantially perpendicular or in any case at an angle of at least 70°) relative to a floor F of the road vehicle 1.

Preferably but without limitation, the display device 5 comprises a manipulation element 12 configured to be grasped by a hand H of the driver DR (as can be seen in the non-limiting embodiment of FIG. 4) and/or of the passenger P to rotate the support element 9 at least between the second configuration in which the screen faces the driver DR and the third configuration in which the screen faces the passenger P (or vice versa) or to bring the support element 9 from said configurations to the first configuration with the screen parallel to the axis T (namely parallel to the surface of the vehicle dashboard 4).

According to some preferred non-limiting embodiments, the manipulation element 12 is the removable portion 16, therefore directly the support element 9 and the screen 10.

According to other non-limiting embodiments not illustrated, the manipulation element 12 comprises a handle integral with the support element 9 and is arranged below or laterally to the screen 10.

Preferably but without limitation, the handle is made in one piece with the support element 9.

Figure 5:
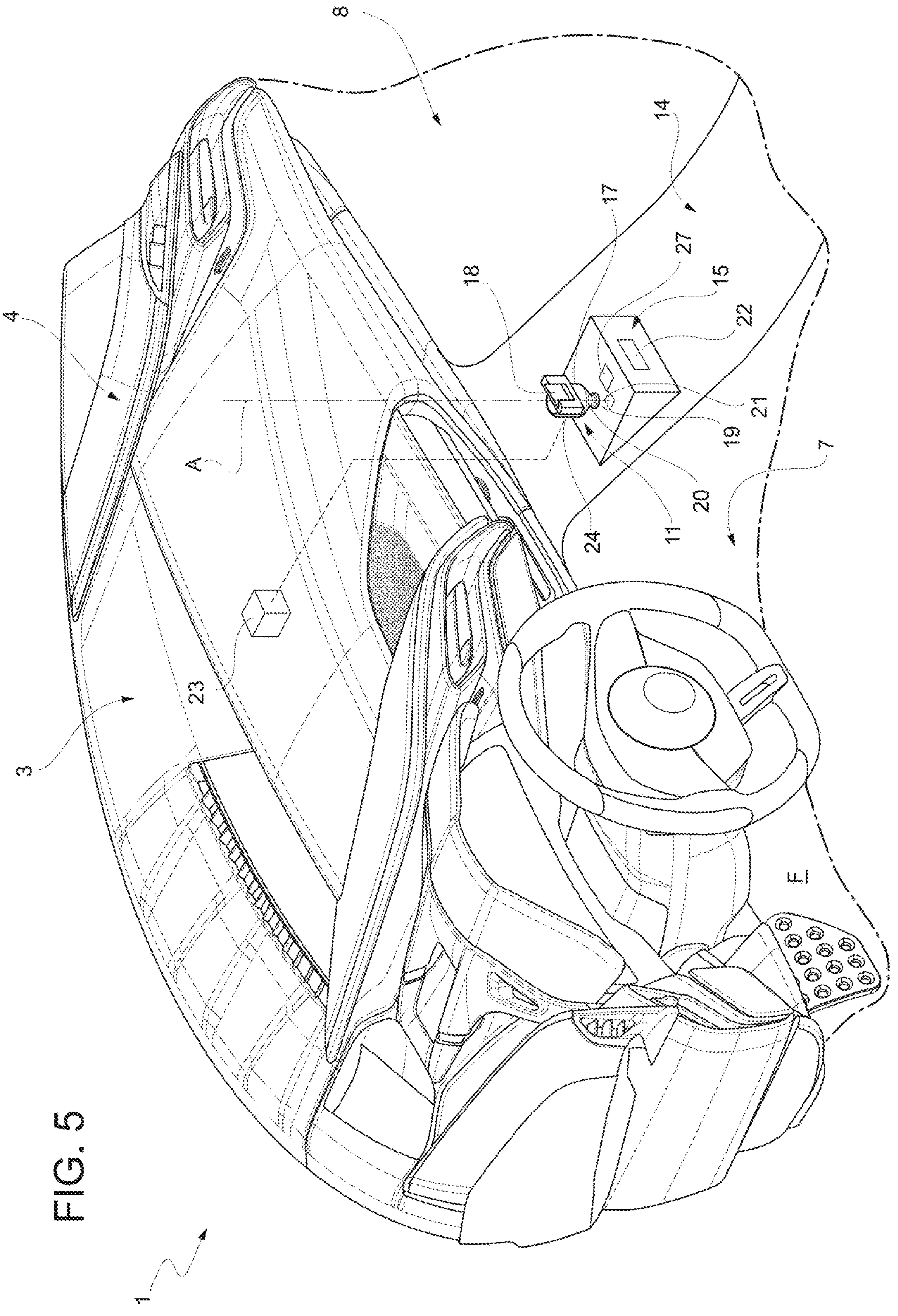
FIG. 5 is a perspective schematic view of part of the interior of the passenger compartment of the vehicle of FIG. 4 in which the central display device has been removed by the user.

According to the non-limiting embodiment of FIG. 5, the movement system 11 comprises at least a swing support 17, of which a first end 18 is attached mechanically or magnetically to the portion 16, in particular to the support element 9, and a second end 19 is hinged, by means of a hinge 20, to the vehicle dashboard 4 or to the tunnel 14 of the road vehicle 1.

In particular, the first hinge 20 is integral with the vehicle dashboard 4 or with the central tunnel 14 of the road vehicle 1. In this way, the hinge 20 does not have to be positioned at the movable portion 16, making the surface of the portion 16 more similar to that of a common tablet.

Advantageously but without limitation, the hinge 20 rotates around the axis A, which is at least partially vertical.

According to some non-limiting embodiments not illustrated, the movement system 11 comprises a further hinge to allow a rotation of the screen 10 around a substantially horizontal axis. In this way, the driver DR or the passenger P can orient the screen 10 also according to their height, for optimal viewing.

In other non-limiting embodiments, in place of the hinge 20 is a ball joint, so as to provide both the above-mentioned degrees of freedom (around a substantially horizontal axis and a substantially vertical axis).

In particular, therefore, the movement system 11, without limitation, is a system with at least two degrees of freedom.

Advantageously but not necessarily, and as illustrated in the non-limiting embodiment of FIG. 5, the movement system 11 comprises at least one locking system 21. The locking system 21 is configured to keep in position the display device 5, namely the support element 9. In this way, it is possible to avoid abrupt repositioning (which can also harm the driver DR) of the display device 5 in the event of extreme vehicle dynamics (for example when braking, i.e. suddenly decelerating before a curve) or, even worse, in the event of an accident.

In some non-limiting cases the locking system 21 is a mechanical system, comprising springs and/or dampers that allow only slow movements of the movement system 11.

In other non-limiting cases, the locking system 21 comprises a servomotor which, for example, allows movement of the movement system 11 only below a certain speed or following an unlocking command by the driver DR.

In accordance with the above, preferably, the display device 5, in particular at a base of the portion 15, as illustrated in the non-limiting embodiment of FIG. 5, comprises an unlocking system 22, which allows the movement system 11 to be released from the locking system 21 to freely move the support element 9.

For example, advantageously but not necessarily, the unlocking system 22 is configured to enable the movement of the servomotors of the locking system 21 to move the support element 9 around the hinge 20.

According to some preferred non-limiting embodiments, the road vehicle 1 further comprises a control unit 23, which is configured to vary the contents shown by the display device 5 between the second configuration in which the screen 10 is inclined relative to the transverse axis T of the road vehicle 1 (namely relative to the surface of the dashboard 4) towards the driver DR, and the third configuration in which the screen 10 is inclined relative to the transverse axis T of the road vehicle 1 towards the passenger P.

In particular, in the second configuration (for example illustrated in FIG. 2) the control unit 23 commands the screen 10 to show driving-related content, for example a circuit, the speed, the lateral acceleration, the lap time, etc. On the other n t hand, in the third configuration (for example illustrated in FIG. 3) the control unit 23 commands the screen 10 to show distracting content such as videos, games, films, etc.

Advantageously but not necessarily, in passing from the third configuration to the second configuration or first configuration, the distracting content is automatically disabled by the control unit 23.

According to some preferred non-limiting embodiments, the display device 5 comprises, between the portion 15 and the portion 16, an attachment/detachment system 24. In particular, the attachment/detachment system 24 comprises a mechanical shape coupling element, for example by means of a snap buckle, and/or a magnetic coupling, the force of which can be overcome by the hand H of the driver twisting the support element 9 with respect to the vehicle dashboard 4 or to the central tunnel 14.

In particular, the connection of the support element 9 to the vehicle dashboard allows improved heat dissipation by the screen 10, and a simpler and more immediate movement by the driver DR, who does not have to completely take his attention off the road, with respect to the support element 9 connected to the central tunnel 14.

In use, during driving, the driver DR can move the support element 9 and therefore the screen 10, thus directing the latter towards himself and facilitating reading of the vehicle data, minimizing distraction from the track, for example. In the same way, the passenger P can direct the screen 10 towards himself. During this step, the control unit 11 enables the viewing of distracting content, preferably when the value of the inclination angle of the screen 10 is such that the screen is not visible from the viewpoint of the driver DR, who therefore cannot be distracted by it.

Furthermore, once the driving session has finished, the driver can take with him the removable portion 16 and use the tablet comprised in it to analyse the performance, review his driving behaviour, and therefore improve performance in the following sessions.

Lastly, the tablet can be used also for purposes other than analysis of driving performance according to the operating system and the applications installed in it.

In other words, advantageously but without limitation, the vehicle screen 10 is integrated in the movable portion 16, which is substantially a tablet.

Although the invention described above makes particular reference to a precise embodiment example, it should not be considered limited to said embodiment example, since its scope includes all the variations, modifications or simplifications covered by the attached claims such as, for example, a different type of road vehicle (for example with front wheel drive), a different shape of the passenger compartment, different movement systems, a different type of screen, etc.

The vehicle and the display device described above have numerous advantages.

Firstly, they reduce distraction of the driver when viewing the vehicle data and information, and when using the mechanical controls.

Furthermore, at the same time, the passenger can be entertained with content that would otherwise be distracting for the driver and should therefore be generally precluded during driving.

In addition, driver safety is guaranteed, preventing the display device from knocking or injuring him in the event of an accident, or in any case moving from the optimal position found, for example, with the vehicle at a standstill; it would be particularly difficult to find said position again during movement of the vehicle, especially during a race.

Lastly, the removable portion allows the driver to use data recorded by the control unit 23 and transmitted directly to the tablet of the removable portion, and review the phases of the sports performance, making use of any data detected and/or processed by the vehicle control units.

LIST OF REFERENCE NUMBERS OF THE FIGURES

1 vehicle
2 wheels
3 passenger compartment
4 dashboard
5 display device
6 central portion
7 driving position
8 passenger position
9 support element
10 screen
11 movement system
12 manipulation element
14 central tunnel
15 fixed portion
16 removable portion
17 swing support
18 first end
19 second end
20 hinge
21 locking system
22 unlocking system
23 control unit
24 attachment/detachment system
A axis
DR driver
F floor
H hand of the driver
L longitudinal axis
P passenger
T transverse axis

The invention claimed is:

1. A content display device (5) for a road vehicle (1); the content display device (5) comprising:

a support element (9) configured to be mounted centrally at a vehicle dashboard (4) or a central tunnel (14) of the road vehicle (1);

at least one screen (10), mechanically connected to the support element (9) and configured to be visible to a passenger (P) and/or to a driver (DR) while driving;

the content display device (5) being characterized in that it comprises a movement system (11) coupled to the support element (9) and hingeable to the vehicle dashboard (4) or to the central tunnel (14) to alternately rotate the screen (10) towards the driver (DR) and/or towards the passenger (P);

the movement system (11) comprising a locking system (21) that can be pressed or depressed to restrict movement of the content display device (5), and an unlocking system (22) that can be pressed or depressed to release the movement system (11) from the locking system (21), thereby allowing the support element (9) to freely move.

2. The device (5) according to claim 1 and comprising a manipulation element (12) configured to be grasped by a hand (H) of the driver (DR) and/or of the passenger (P) to rotate the support element (9) at least between a first configuration wherein the screen (10) faces the driver (DR) and a second configuration wherein the screen (10) faces the passenger (P).

3. The device (5) according to claim 2, wherein the manipulation element (12) comprises the support element 9.

4. The device (5) according to claim 1, wherein the movement system (11) comprises at least one swing support (17), of which a first end (18) is mechanically or magnetically attached to the support element (9), and a second end (19) is hingeable, by means of a hinge (20) or a ball joint, to the vehicle dashboard (4) or to the tunnel (14) of the road vehicle (1).

5. The device (5) according to claim 4, wherein the first end (18) is configured to rotate, together with the support element (9), around an at least partially vertical axis (A).

6. A road vehicle (1) comprising:

four wheels (2), of which at least one pair of wheels (2) is a pair of driving wheels;

a passenger compartment (3) configured to accommodate a driver (DR) and at least one passenger (P) alongside the driver (DR);

a vehicle dashboard (4);

the vehicle (1) being characterized in that it comprises a content display device (5) according to claim 1, wherein the movement system (11) is hinged at a central portion (6) of the vehicle dashboard (4) or of the central tunnel (14), between a driving position (7) and a passenger (P) position (8).

7. The road vehicle (1) according to claim 6, wherein the movement system (11) comprises a swing support (17), of which a first end (18) is mechanically or magnetically attached to the support element (9), and a second end (19) is hinged, by means of a hinge (20) or a ball joint, to the vehicle dashboard (4) or to the tunnel (14) of the road vehicle (1).

8. The vehicle (1) according to claim 6, wherein the movement system (11) is configured to rotate the support element (9) about an axis (A) at least partially transverse to a floor (F) of the road vehicle (1).

9. The vehicle (1) according to claim 6 and comprising a control unit (23), which is configured to vary the contents displayed by the display device (5) between a first configuration in which the screen (10) is inclined, starting from a transverse axis (T) of the road vehicle (1), towards the driver (DR), and a second configuration in which the screen (10) is inclined, starting from the transverse axis (T) of the road vehicle (1), towards the passenger (P).

* * * * *